United States Patent Office 3,065,129
Patented Nov. 20, 1962

3,065,129
SULFUR-CONTAINING CARBOXYLATES
Lee A. Miller, Dayton, Ohio, assignor to Monsanto Chemical Company, St. Louis, Mo., a corporation of Delaware
No Drawing. Filed Oct. 3, 1960, Ser. No. 59,822
16 Claims. (Cl. 167—30)

This invention relates to organic compounds of sulfur and more particularly provides the method of preparing sulfonyl acrylates, biological toxicants comprising the same, and biological toxicant methods in which the sulfonyl acrylates are employed as the effective ingredients.

According to the invention the arylsulfonylacrylates are prepared by the reaction of an aromatic hydrocarbon sulfinic acid or an alkali metal salt thereof and an alkyl propiolate, substantially according to the following scheme in the case of the free acid:

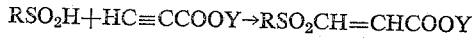

in which R is an aromatic hydrocarbon radical of from 6 to 12 carbon atoms and Y is an alkyl radical of from 1 to 5 carbon atoms.

The presently prepared compounds are thus alkyl 3-arylsulfonylacrylates.

Aromatic hydrocarbon sulfinic acids or the alkali metal salts thereof which are useful for preparing the arylsulfonylacrylates are benzenesulfinic acid, α- or β-naphthalenesulfinic acid, 2-, 3-, or 4-biphenylsulfinic acid or such acids which are nuclearly substituted by an alkyl radical, e.g., 2-, 3- or 4-toluenesulfinic acid, 2-, 3- or 4-ethylbenzenesulfinic acid, 2,3-, 3,4- or 2,5-dimethylbenzenesulfinic acid, pentamethylbenzenesulfinic acid, 2,3-diisopropylbenzenesulfinic acid, 4-hexylbenzenesulfinic acid, and β-ethylnaphthalenesulfinic acid. The alkali metal salts of the aromatic hydrocarbon sulfinic acids, i.e., the sodium, potassium, lithium, rubidium and cesium salts of the free acids, are preferred for effecting the reaction.

Presently useful alkyl propiolates are methyl, ethyl, propyl, isopropyl, butyl, isobutyl, tert-butyl, pentyl, isopentyl or tert-pentyl propiolate.

Reaction of the aromatic hydrocarbon sulfinic acid or alkali metal salt thereof with the alkyl propiolate takes place readily by simply mixing the two reactants at ordinary or increased temperature and in the presence or absence of an acidic or basic catalyst or of a solvent or diluent. Optimum conditions, I have found, comprise operation at increased temperatures, say, at a temperature of from 50° C. to 125° C., use of a basic catalyst, and use of an inert diluent or solvent. When a solvent or diluent is employed, operation at reflux is generally preferred. Inert liquid diluents or solvents which are presently useful are the liquid hydrocarbons generally, e.g., benzene, toluene, xylene, hexane, petroleum spirits; the chlorinated hydrocarbons such as dichlorobenzene, ethylene dichloride or carbon tetrachloride; polar solvents such as dioxane, ethanol or water, other oxygenated compounds such as isopropyl ether or acetone or 2-butanone, etc.

As herein stated, reaction of the arylsulfinic acid or salt thereof with the alkyl propiolate to give the 2-arylsulfonylacrylates proceeds in the presence or absence of basic catalysts. Basic catalysts useful in the process include organic bases such as pyridine, the quaternary ammonium salts or bases such as trimethylbenzylammonium hydroxide, the alkali and alkali metal hydroxides or basic salts thereof such as sodium, potassium, lithium, calcium, or magnesium hydroxide, carbonate or acetate; alkal or alkali metal alcoholates such as sodium methylate, etc. Examples of useful acidic catalysts are acid-reacting metals such as cuprous or cupric, stannous or stannic, ferrous or ferric acetates, sulfates or chlorides, etc.

Inasmuch as molecular equivalents of the sulfinic acid or salt thereof and of the alkyl propiolate are involved in the formation of the presently provided alkyl 3-arylsulfonylacrylates, it is advantageous to employ stoichiometric proportions of the two reactants. If desired, however, an excess of either reactant may be employed since any unreacted material is readily separated from the product.

Examples of the presently prepared alkyl 3-arylsulfonylacrylates are ethyl 3-phenylsulfonylacrylate from ethyl propiolate and benzenesulfinic acid or the sodium or potassium salt thereof; pentyl 3-(4-tolylsulfonyl)acrylate from pentyl propiolate and 4-toluenesulfinic acid or the sodium or lithium salt thereof; isopropyl 3-(4-butylphenylsulfonyl)acrylate from isopropyl propiolate and 4-butylbenzenesulfinic acid or the potassium or rubidium salt thereof; methyl 3-β-naphthylsulfonylacrylate from methyl propiolate and β-naphthalenesulfinic acid or the sodium or potassium salt thereof; butyl 3-(α-methyl-β-naphthylsulfonyl)acrylate from methyl propiolate and α-methyl-β-naphthalenesulfinic acid or the sodium or lithium salt thereof; propyl 3-(4-biphenylsulfonyl)acrylate from propyl propiolate and 4-biphenylsulfinic acid or the sodium or potassium salt thereof; methyl 3-(2-hexylphenylsulfonyl)acrylate from methyl propiolate and 2-hexylbenzenesulfinic acid or the potassium or lithium salt thereof, etc.

The presently prepared alkyl 3-arylsulfonylacrylates are stable, rather high-boiling viscous liquids or waxy to crystalline solids which are useful as vulcanization accelerators for rubbers, as copolymerizing monomers with vinyl compounds in synthetic resin and plastics manufacture, and as biological toxicants, e.g., as bacteriostats, fungistats and insecticides.

The invention is further illustrated by, but not limited to, the following examples:

*Example 1*

A mixture consisting of 16.42 g. (0.1 mole) of sodium benzenesulfinate, 9.2 g. (0.11 mole) of methyl propiolate, 100 ml. of benzene and 1 ml. of 40% methanolic trimethylbenzylammonium hydroxide was heated at reflux for 12 hours. The reaction mixture was allowed to attain room temperature and then filtered. Evaporation of the filtrate gave as residue a brown oil which solidified upon standing. Recrystallization of the solid from absolute methanol gave colorless rods of the substantially pure methyl 3-phenylsulfonylacrylate, M.P. 99–100° C., which analyzed 53.12% carbon and 4.61% hydrogen as against 53.08% and 4.46%, the respective calculated values. Infrared analysis supported the structure in that the following values were obtained:

C=O at 1740 cm.$^{-1}$
C=C at 1650 cm.$^{-1}$
Phenyl at 1600 cm.$^{-1}$
Methyl at 1450 cm.$^{-1}$
SO$_2$ at 1320 and 1160 cm.$^{-1}$
C—O-ester at 1250 cm.$^{-1}$

Example 2

This example shows testing of the methyl 3-phenylsulfonylacrylate of Example 1 against the fungus *Aspergillus niger*. The following procedure was used:

An inoculum preparation of *Aspergillus niger* SN–111 was prepared by adding 10 ml. of sterile distilled water to a 7-day old, Sabouraud's dextrose agar slant culture thereof and dislodging the organisms into the water with a transfer needle.

Culture media was prepared by respectively adding 18 ml. of Sabouraud's dextrose agar to 18 x 150 mm. straight side test tubes, capping with metal culture tube caps, and sterilizing in an autoclave for fifteen minutes at 121° C.

A stock solution of the test compound was prepared by dissolving 100 mg. of the compound in 10 ml. of acetone: a 1% acetone solution of the compound was thus obtained.

Using a sterile 5 ml. pipette, 2 ml. of said 1% solution were respectively transferred to a tube of melted, sterile culture media prepared as described above. A dilution of 1 part of test compound per 1,000 parts of agar resulted. Dilution was thus repeated until a concentration of one part of test compound per 100,000 parts of agar was obtained. The thus-diluted agar was then poured into sterile Petri dishes and allowed to harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in those of the plates which contained the 1:100,000 concentration of the methyl 3 - phenylsulfonylacrylate, whereas profuse growth of the *Aspergillus niger* was noted in both of the "control" plates.

Example 3

This example shows testing of the methyl 3-phenylsulfonylacrylate of Example 1 against the bacteria *Staphylococcus aureus* and *Salmonella typhosa*.

The following procedure was used: A 1% acetone solution of the test compound was prepared and diluted in sterile, melted nutrient agar to give an 0.01% concentration of the test compound in the agar. The agar solutions of the test compound were then poured into Petri dishes and allowed to harden. These plates as well as duplicate "controls" (plates of sterile nutrient agar containing the same concentration of acetone but none of the test compound) were respectively inoculated with the *Staphylococcus aureus* or the *Salmonella typhosa*, and incubated for two days at 37° C. At the end of that time, inspection of the plates showed no growth of either organism on any of the plates which contained the 0.01% concentration of the methyl 3-phenylsulfonylacrylate, whereas profuse growth of both of the test organisms was noted on the "controls."

The presently prepared alkyl 3-arylsulfonylacrylates are characterized by a high degree of efficacy in that they inhibit growth of bacteria and fungi at even very low concentrations. Biological toxicant compositions containing the present compounds are advantageously obtained by first preparing a solution thereof in an organic solvent and then adding the resulting solution to water containing an emulsifying agent to form an oil-in-water emulsion. Because of their effectiveness, they are present in the toxicant compositions in only very small concentrations, for example, in concentrations of from 0.0001 percent to 1.0 percent by weight of the total weight of the emulsion. Emulsifying agents which may be employed are those customarily used in the art for the preparation of oil-in-water emulsions. Examples of emulsifying agents which may be used include alkylbenzenesulfonates, long chained polyalkylene glycols, long chained alkylsulfosuccinates, etc.

While the present compounds are most advantageously employed as biological toxicants by incorporating them into an emulsion as herein described, they may also be incorporated into solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution.

What I claim is:

1. The method which comprises contacting an alkyl propiolate having from 1 to 5 carbon atoms in the alkyl radical with a compound selected from the class consisting of aromatic hydrocarbon sulfinic acids of from 6 to 12 carbon atoms and the alkali metal salts thereof and recovering from the resulting reaction product an alkyl 3-arylsulfonylacrylate wherein the alkyl radical has from 1 to 5 carbon atoms and the aryl radical has from 6 to 12 carbon atoms.

2. The method which comprises contacting an alkyl propiolate having from 1 to 5 carbon atoms in the alkyl radical with an alkali metal salt of an aromatic hydrocarbon sulfinic acid of from 6 to 12 carbon atoms and recovering from the resulting reaction product an alkyl 3-arylsulfonylacrylate wherein the alkyl radical has from 1 to 5 carbon atoms and the aryl radical has from 6 to 12 carbon atoms.

3. The method which comprises contacting, in the presence of a basic catalyst, an alkyl propiolate having from 1 to 5 carbon atoms in the alkyl radical with an alkali metal salt of benzenesulfinic acid and recovering from the resulting reaction product an alkyl 3-phenylsulfonylacrylate having from 1 to 5 carbon atoms in the alkyl radical.

4. The method which comprises contacting methyl propiolate with sodium benzenesulfinate in the presence of a basic catalyst and recovering methyl 3-phenylsulfonylacrylate from the resulting reaction product.

5. A composition effective against fungi and bacteria which comprises an inert carrier and as the essential effective active ingredient an alkyl 3-arylsulfonylacrylate in which the alkyl radical has from 1 to 5 carbon atoms and the aryl radical has from 6 to 12 carbon atoms.

6. A composition effective against fungi and bacteria which comprises an inert carrier and as the essential effective active ingredient an alkyl 3-phenylsulfonylacrylate in which the alkyl radical has from 1 to 5 carbon atoms.

7. A composition effective against fungi and bacteria which comprises an inert carrier and a toxic quantity of methyl 3-phenylsulfonylacrylate.

8. The method of inhibiting the growth of microorganisms selected from the class consisting of fungi and bacteria which comprises exposing said microorganisms to a growth-inhibiting quantity of an alkyl 3-arylsulfonylacrylate in which the alkyl radical has from 1 to 5 carbon atoms and the aryl radical has from 6 to 12 carbon atoms.

9. The method of inhibiting the growth of microorganisms selected from the class consisting of fungi and bacteria which comprises exposing said microorganisms to a growth-inhibiting quantity of an alkyl 3-phenylsulfonylacrylate in which the alkyl radical has from 1 to 5 carbon atoms.

10. The method of inhibiting the growth of microorganisms selected from the class consisting of fungi and bacteria which comprises exposing said microorganisms to a growth-inhibiting quantity of methyl 3-phenylsulfonylacrylate.

11. A fungistat composition comprising an inert carrier and, as the essential effective ingredient, a fungistatic quantity of an alkyl 3-arylsulfonylacrylate in which the alkyl radical has from 1 to 5 carbon atoms and the aryl radical has from 6 to 12 carbon atoms.

12. A fungistat composition comprising an inert carrier and a fungistatic quantity of methyl 3-phenylsulfonylacrylate as the essential effective ingredient.

13. The method of inhibiting the growth of fungus which comprises exposing the fungi to a growth-inhibiting quantity of an alkyl 3-arylsulfonylacrylate in which the alkyl radical has from 1 to 5 carbon atoms and the aryl radical has from 6 to 12 carbon atoms.

14. A bacteriostat composition comprising an inert carrier and, as the essential effective ingredient, a bacteriostatic quantity of an alkyl 3-arylsulfonylacrylate in which the alkyl radical has from 1 to 5 carbon atoms and the aryl radical has from 6 to 12 carbon atoms.

15. A bacteriostat composition comprising an inert carrier and a bacteriostatic quantity of methyl 3-phenylsulfonylacrylate as the essential effective ingredient.

16. The method of inhibiting the growth of bacteria which comprises exposing the bacteria to a growth-inhibiting quantity of an alkyl 3-arylsulfonylacrylate in which the alkyl radical has from 1 to 5 carbon atoms and the aryl radical has from 6 to 12 carbon atoms.

References Cited in the file of this patent

UNITED STATES PATENTS

| | | |
|---|---|---|
| 2,883,317 | Heminger | Apr. 21, 1959 |
| 2,897,081 | Dersch | July 28, 1959 |
| 2,969,387 | Horn | Jan. 24, 1961 |
| 2,978,480 | Luckenbaugh | Apr. 4, 1961 |